Patented Dec. 25, 1934

1,985,737

UNITED STATES PATENT OFFICE 1,985,737

PROCESS OF MANUFACTURING OF LIGHT NAILABLE BRICKS

Hermann Mayr, Munich, Germany

No Drawing. Application January 9, 1932, Serial No. 585,797. In Germany January 8, 1931

3 Claims. (Cl. 25—156)

Nailable bricks consisting of a mixture of loam and turf are known. Compounds of that kind may be burnt only if a temperature is used that keeps slowly rising by degrees, such compounds being unable to withstand the maximum temperature required for bricks of the ordinary kind. In order to obtain good, light, and nailable building material of high grade durability and solidity, the necessary mixing proportions of loam and turf would be about 35 parts of loam by 65 parts of turf. The voluminal proportions of 35 by 65 are corresponding, in the finished materials, to a proportion in weight of 40 kilograms of turf by 60 kilograms of loam. These voluminal proportions may be varied up to 25 by 75. The proportion depends on the respective properties and qualities of loam and turf and, further, on the solidity of the brick that may be desired in each case. Experience has shown that just with these mixing proportions of the prime-materials, i. e. about 35 by 65, a certain straining occurs during the drying and, especially, during the burning of the material, said strains causing the bricks to burst and tear. This fact is the reason why no satisfactory results have been obtained in this line so far, in spite of the many experiments made in that direction. Thus, up till now, a nailable brick of loam and turf was practically unknown as an article of trade.

The present invention relates to a process of producing a nailable brick. According to this process moulded forms consisting of a compound of loam and turf are burnt. The loam and turf are mixed with collodion and with water to form a plastic mass composed of these four ingredients.

Owing to this treatment nails and screws may be driven into the material without any preliminary boring, even into strongly burnt bricks, and no cracking or bursting of any kind will ever occur. Even with the considerable quantity of turf in a mixture of 75 voluminal parts of loam the cracking or bursting of the bricks will be completely avoided. Aside from that the brick has been reduced in weight up to 50 per cent.

The preferred manner of preparing the material from which the bricks are made is to mix loam in substantially the proportion previously set forth, and to introduce into the mixing vat through separate pipes collodion and water. The mass is then thoroughly agitated so that the collodion and water permeate the mass. When the mass reaches the desired degree of plasticity it is molded into bricks which are dried and burned.

The mixing proportions of collodion and water, as well as those of loam and turf, will always depend on the respective qualities of the prime-materials, more or less, and on the purposes for which the brick to be made will be used, especially on the solidity that may be required in each case.

The following figures are intended to serve as an example of execution:

On an average the proportion of collodion to water will be of about 7.5 parts of collodion and about 92.5 parts of water. The aggregate amount of collodion and of water will be about 250 litres to be used for one cubic-metre of turf.

The moistening of the turf with this wash is best effected by means of irrigation.

The proportions in weight between turf and loam will be 25 by 75 in the finished material, on an average.

I claim:

1. A composition of loam, turf, collodion and water for producing nailable bricks by means of burning said composition.

2. A composition of 40 to 60 volumetric parts of loam, 25 to 40 volumetric parts of turf, 15 to 25 volumetric parts of water and ½ to 1 volumetric part of collodion for producing bricks by burning said composition.

3. The process of producing molded articles which consists in mixing loam and turf and in thereafter introducing collodion and water to the mixture to moisten the loam and turf and to reduce them to a plastic state, then molding the plastic mass into desired form, after which the molded articles are dried, and then burning the dried articles.

HERMANN MAYR.